United States Patent
Seo et al.

(10) Patent No.: US 9,572,178 B1
(45) Date of Patent: Feb. 14, 2017

(54) NODE UNIT OF DISTRIBUTED ANTENNA SYSTEM

(71) Applicant: SOLiD, INC., Seongnam-si, Gyeonggi-do (KR)

(72) Inventors: Kwangnam Seo, Guri-si (KR); Doyoon Kim, Bucheon-si (KR); Hyoungho Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/079,442

(22) Filed: Mar. 24, 2016

(30) Foreign Application Priority Data

Oct. 12, 2015 (KR) .......................... 10-2015-0142133

(51) Int. Cl.
H04W 88/00 (2009.01)
H04W 72/12 (2009.01)
H04W 72/04 (2009.01)
H04W 88/08 (2009.01)

(52) U.S. Cl.
CPC ..... *H04W 72/1268* (2013.01); *H04W 72/0413* (2013.01); *H04W 88/085* (2013.01)

(58) Field of Classification Search
None
See application file for complete search history.

(56) References Cited

U.S. PATENT DOCUMENTS

| 6,704,545 | B1   | 3/2004 | Wala |
| 6,714,529 | B1 * | 3/2004 | Tanabe ................ G01L 3/1478 370/343 |
| 8,958,789 | B2   | 2/2015 | Bauman et al. |
| 2009/0196177 | A1 * | 8/2009 | Teyeb ................. H04B 7/2606 370/231 |

* cited by examiner

*Primary Examiner* — Alex Skripnikov
(74) *Attorney, Agent, or Firm* — Sughrue Mion, PLLC

(57) ABSTRACT

The inventive concept relates to a distributed antenna system (DAS), and more particularly, to an uplink signal transmission operation of each of node units constituting a DAS. A node unit of a DAS includes a signal input/output unit configured to receive m uplink signals from m lower node units and output the m uplink signals, and a multiplexer configured to generate a single uplink signal by selectively outputting any one of the m uplink signals at an interval of a predetermined output time. Accordingly, it is possible to provide a DAS capable of processing and outputting, as one signal, uplink signals received from a plurality of remote units, without any error.

11 Claims, 12 Drawing Sheets

NODE UNIT OF DISTRIBUTED ANTENNA SYSTEM

CROSS REFERENCE TO RELATED APPLICATIONS

This application claims priority from Korean Patent Application No. 10-2015-0142133, filed on Oct. 12, 2015, in the Korean Intellectual Property Office, the contents of which are incorporated herein by reference in their entireties.

BACKGROUND

1. Field

The inventive concept relates to a distributed antenna system (DAS), and more particularly, to an uplink signal transmission operation of each of node units constituting a DAS.

2. Description of Related Art

Base stations are established at proper positions so as to maintain the quality of mobile communication services, but much cost is required to establish and operate base stations. Therefore, separate communication relay systems for mobile communication relay are built up in shadow areas such as in-buildings, subways, underground roadways, and tunnels, which are locally generated due to electromagnetic interference or physical barriers. A representative among the communication relay systems is a distributed antenna system (DAS).

In the DAS, a plurality of remote units (RUs) each including an antenna are evenly distributed in mobile communication service areas, thereby providing improved mobile communication services. The DAS may include a master unit (MU) connected to a base station (BTS) and a plurality of RUs connected to the MU. The RUs evenly distributed in all of the areas form virtual cells with a user's mobile communication terminal, to provide high-quality communication services to even mobile communication terminals located at boundaries between the cells.

Each RU of the DAS performs mobile communication with the BTS through the MU. In a downlink (forward direction) in which a signal is transmitted from the BTS to a mobile communication terminal, the BTS transmits a downlink signal to the MU, and the MU transmits the downlink signal received from the BTS to each RU such that the downlink signal is transmitted to the mobile communication terminal. In an uplink (reverse direction) in which a signal is transmitted from the mobile communication terminal to the BTS, the mobile communication terminal transmits an uplink signal to an RU connected thereto, the RU transmits the received uplink signal to an RU as an upper node (node connected closer to the MU), and the RU as the upper node transmits the uplink signal to the MU such that the uplink signal is transmitted to the BTS.

However, since the MU and the BTS are connected through one channel in the DAS, the MU should transmit, through one path, uplink signals received from the plurality of RUs connected thereto. To this end, a conventional method was used in which the MU arithmetically summed a plurality of digital uplink signals. For example, it is assumed that the MU has received two digital uplink signals, and one of the two digital uplink signals correspond to [1 2 3] and the other of the two digital uplink signals correspond to [4 5 6]. In this case, according to the conventional method, the MU may generate a summed uplink signal corresponding to [5 7 9] by arithmetically summing the two digital uplink signals. A function of preventing digital overflow may be additionally performed on the generated summed uplink signal.

In the conventional method, a transmission target uplink signal, which is transmitted to upper node units, can be simply generated by arithmetically summing received uplink signals. However, the magnitude of the transmission target uplink signal increases, and therefore, digital overflow may occur. In order to solve this problem, a separate auto level control (ALC) function should be performed on the transmission target uplink signal, which results in an increased in complexity of the DAS.

SUMMARY

The inventive concept is directed to a distributed antenna system capable of processing and outputting, as one signal, uplink signals received from a plurality of remote units, without any arithmetically sum.

According to an aspect of the inventive concept, there is provided a node unit of a distributed antenna system, comprising: a signal input/output unit configured to receive m uplink signals from m lower node units and output the m uplink signals; and a multiplexer configured to generate a single uplink signal by selectively outputting any one of the m uplink signals at an interval of a predetermined output time, wherein m is a natural number of 2 or more.

According to an exemplary embodiment, each of the m uplink signals may be a discrete signal sampled in accordance with a predetermined sampling period, and the output time may be set to be equal to or less than a time obtained by dividing m into the sampling period.

According to an exemplary embodiment, a sampling rate of the single uplink signal may be equal to or greater than a value obtained by multiplying a sampling rate of any one of the m uplink signals by m.

According to an exemplary embodiment, the node unit may further comprise a filter configured to output an image eliminated signal by eliminating an image signal from the single uplink signal.

According to an exemplary embodiment, the node unit may further comprise a down-sampler configured to output a transmission target uplink signal by converting a sampling rate of the image eliminated signal to correspond to the sampling rate of any one of the m uplink signals.

According to another aspect of the inventive concept, there is provided a remote unit of a distributed antenna system, comprising: a converter configured to convert a terminal signal received from a mobile communication terminal into a first uplink signal and output the first uplink signal; and a multiplexer configured to generate a single uplink signal by selectively outputting any one of the first uplink signal and a second uplink signal at an interval of a predetermined output time, wherein the second uplink signal is received from a lower node unit.

According to an exemplary embodiment, each of the first uplink signal and the second uplink signal may be a discrete signal sampled in accordance with a predetermined sampling period, and the output time may be set to be equal to or less than a time obtained by dividing 2 into the sampling period.

According to an exemplary embodiment, a sampling rate of the single uplink signal may be equal to or greater than a value obtained by multiplying a sampling rate of any one of the first uplink signal and the second uplink signal by 2.

According to an exemplary embodiment, the remote unit may further comprise a filter configured to output an image eliminated signal by eliminating an image signal from the single uplink signal.

According to an exemplary embodiment, the remote unit may further comprise a down-sampler configured to output a transmission target uplink signal by converting a sampling rate of the image eliminated signal to correspond to the sampling rate of any one of the first uplink signal and the second uplink signal.

According to still another aspect of the inventive concept, there is provided a node unit of a distributed antenna system, comprising: a first signal processing unit configured to receive first uplink signals and generate a first transmission target uplink signal by selectively outputting any one of the first uplink signals at an interval of a predetermined output time; a second signal processing unit configured to receive second uplink signals and generate a second transmission target uplink signal by selectively outputting any one of the second uplink signals at the interval of the output time; and a third signal processing unit configured to receive the first transmission target uplink signal and the second transmission target uplink signal and generate a third transmission target uplink signal by selectively outputting any one of the first transmission target uplink signal and the second transmission target uplink signal at the interval of the output time.

According to an exemplary embodiment, at least one of the first signal processing unit, the second signal processing unit, and the third signal processing unit may include a multiplexer configured to generate a corresponding single uplink signal by selectively outputting any one of corresponding received uplink signals at the interval of the output time.

According to an exemplary embodiment, each of the corresponding received uplink signals may be a discrete signal sampled in accordance with a predetermined sampling period, and the output time may be set to be equal to or less than a time obtained by dividing the number of the corresponding received uplink signals into the sampling period.

According to an exemplary embodiment, a sampling rate of the corresponding single uplink signal may be equal to or greater than a value obtained by multiplying a sampling rate of any one of the corresponding received uplink signals by the number of the corresponding received uplink signals.

According to an exemplary embodiment, at least one of the first signal processing unit, the second signal processing unit, and the third signal processing unit may further include a filter configured to output a image eliminated signal by eliminating an image signal from the corresponding single uplink signal.

According to an exemplary embodiment, at least one of the first signal processing unit, the second signal processing unit, and the third signal processing unit may further include a down-sampler configured to output a corresponding transmission target uplink signal by converting a sampling rate of the image eliminated signal to correspond to the sampling rate of any one of the corresponding received uplink signals.

According to an exemplary embodiment, at least one of the first signal processing unit, the second signal processing unit, and the third signal processing unit may include: an up-sampler configured to generate a plurality of up-sampling signals by up-sampling a corresponding received uplink signals according to a predetermined up-sampling rate; and a multiplexer configured to generate a corresponding single uplink signal by selectively outputting any one of the up-sampling signals at the interval of the output time.

According to an exemplary embodiment, the up-sampler may generate the up-sampling signal by inserting invalid sample information between valid sample information of the corresponding received uplink signals, wherein each of the corresponding received uplink signals is a discrete signal sampled in accordance with a predetermined sampling period.

According to the inventive concept, it is possible to provide a distributed antenna system capable of processing and outputting, as one signal, uplink signals received from a plurality of remote units, without any error.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
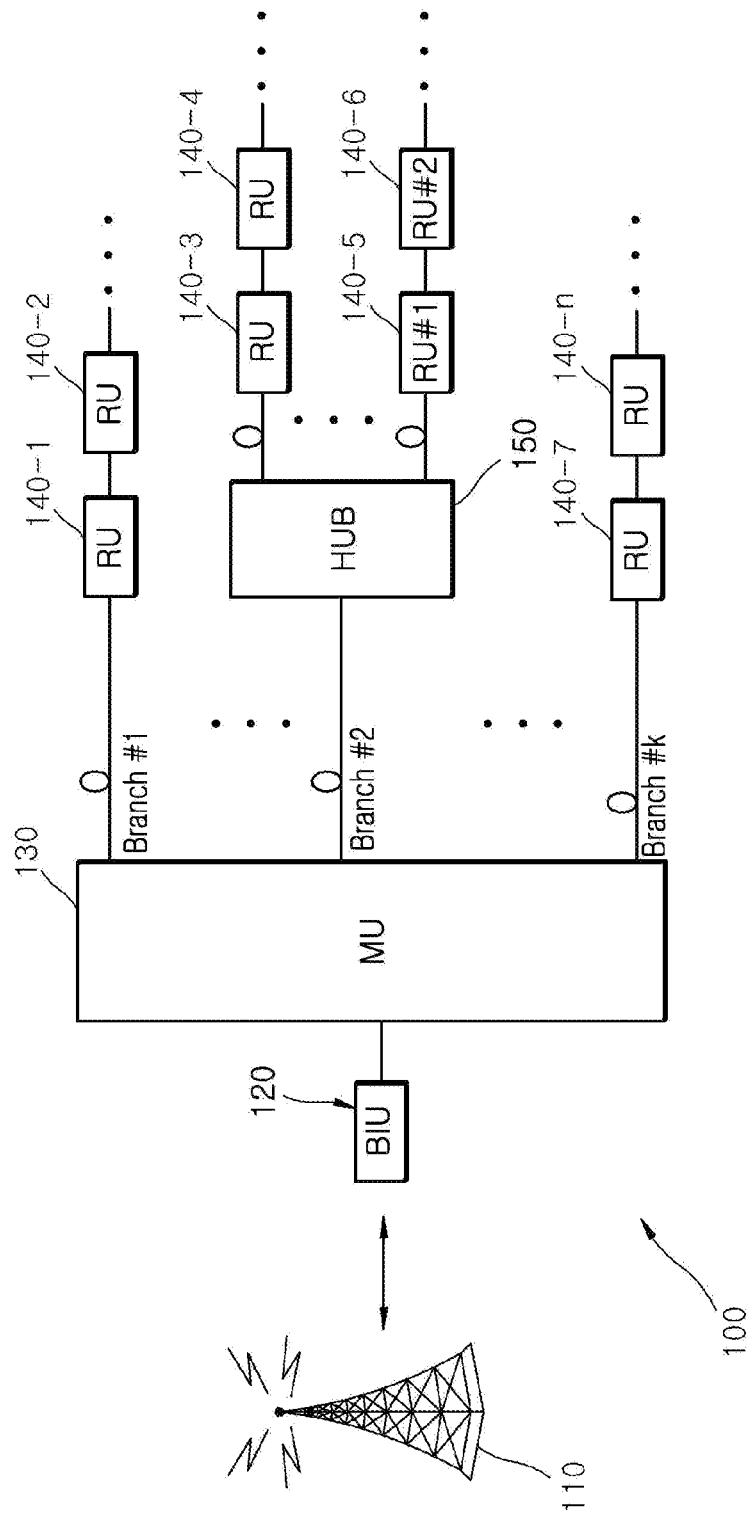
FIG. 1 is a diagram illustrating an example of a topology of a distributed antenna system (DAS) as one form of the DAS to which the inventive concept is applicable.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

It is noted that the components of the inventive concept are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

A distributed antenna system (DAS) according to an embodiment of the inventive concept is a coverage system for in-building services, which perform voice communication and data communication with high quality and seamless access. Also, the DAS is a system for servicing, through one antenna, analog and digital phone systems that are serviced in a plurality of bands. The DAS according to the embodiment of the inventive concept is mainly mounted in public institutions and private facilities such as shopping malls, hotels, campuses, air ports, hospitals, subways, sports complexes, and convention centers. The DAS according to the embodiment of the inventive concept improves inferior radio wave environment in buildings, improves poor received signal strength indication (RSSI) and chip energy/others interference (Ec/Io) that is total reception sensitivity of a mobile terminal, and services mobile communication up to the corners of buildings, so that a communication service user can freely use communication services at any place in a building. The DAS according to the embodiment of the inventive concept can support mobile communication standards used all over the world.

For example, the distributed antenna system can support a very high frequency (VHF), an ultra high frequency (UHF), frequencies having bands of 700 MHz, 800 MHz, 850 MHz, 900 MHz, 1900 MHz, 2100 MHz, 2600 MHz, etc., and FDD and TDD type services. In addition, the distributed antenna system can support a plurality of mobile communication standards such as advanced mobile phone service (AMPS) that is a representative analog mobile communication service, and time-division multiplexing access (TDMA), code division multiple access (CDMA), wideband code division multiple access (WCDMA), high speed downlink packet access (HSDPA), long term evolution (LET), and long term evolution advanced (LTE-A), which are digital mobile communication services.

Hereinafter, exemplary embodiments of the inventive concept will be sequentially described in detail with reference to the accompanying drawings.

FIG. 1 is a diagram illustrating an example of a topology of a DAS as one form of the DAS to which the inventive concept is applicable.

Referring to FIG. 1, the DAS 100 may include a base station interface unit (BIU) 120 and a master unit (MU) 130, which serve as headend nodes of the DAS, a hub unit (HUB) 150 serving as an extension node of the DAS, and a plurality of remote units (RUs) 140-1, 140-2, . . . , 140-$n$ ($n$ is a natural number) (when necessary, commonly referred to as 140-$n$), which are respectively disposed at remote service positions and serve as remote nodes. The DAS may be implemented as an analog DAS or a digital DAS. When necessary, the DAS may be implemented as a hybrid of the analog DAS and the digital DAS (e.g., to perform analog processing on some nodes and digital processing on the other nodes).

FIG. 1 illustrates an example of the topology of the DAS 100, and the DAS 100 may have various topologies in consideration of particularity of its installation area and application field (e.g., in-building, subway, hospital, stadium, etc.). In view of the above, the number of the BIU 120, the MU 130, the HUB 150, and the RUs 140-$n$ and connection relations between upper and lower node units among the BIU 120, the MU 130, the HUB 150, and the RUs 140-$n$ may be different from those of FIG. 1. In the DAS, the HUB 150 may be used when the number of branches to be branched in a star structure from the MU 130 is limited as compared with the number of RUs 140-$n$ required to be installed. Therefore, the HUB 150 may be omitted when only the single MU 130 sufficiently covers the number of RUs 140-$n$ required to be installed, when a plurality of MUs 130 are installed, or the like. Hereinafter, nodes in the DAS applicable to the inventive concept and their functions will be sequentially described based on the topology of FIG. 1.

The BIU 120 serves as an interface between the BTS 110 such as a base station and the MU 130 in the DAS. In FIG. 1, it is illustrated that the single BTS 110 is connected to the single BIU 120. However, the BIU 120 may be separately provided for each provider, each frequency band, or each sector.

In general, a radio frequency (RF) signal transmitted from the BTS 110 is a signal with high power. Hence, the BIU 120 converts the RF signal with high power into a signal with power suitable to be processed in the MU 130 and transmit the converted signal to the MU 130. Also, the BIU 120, as shown in FIG. 1, may receive mobile communication service signals for each frequency band (or each provider or each sector), combine the received signals, and then transmit the combined signal to the MU 130.

When the BIU 120 converted a high-power signal from the BTS 110 into a low-power signal, combines mobile communication service signals, and then transmits the combined signal to the MU 130, the MU 130 distributes the combined and transmitted mobile communication signal (hereinafter, referred to as 'relay signal') for each branch. In this case, when the DAS is implemented as the digital DAS, the BIU 120 may be separated into a unit for converting a high-power RF signal into a low-power RF signal, and a unit for converting a low-power RF signal into an intermediate frequency (IF) signal, performing digital signal processing on the converted IF signal, and then combining the digital signal processed signal (it will be apparent that the BIU 120 may perform digital signal processing on an RF signal without converting the RF signal into an IF signal). Alternatively, when the BIU 120 performs only the function of converting the high-power signal from the BTS 110 into the low-power signal, the MU 130 may combine the transmitted relay signals and distribute the combined relay signal for each branch.

As described above, the combined relay signal distributed from the MU 130 is transmitted to RUs 140-*n* through the HUB 150 or directly transmitted to RUs 140-*n*, for each branch (see Branch #1, . . . , Branch #k, . . . , Branch #k of FIG. 1) (here, k is a natural number). Each RU 140-*n* separates the transmitted combined relay signal for each frequency band and performs signal processing (analog signal processing in the analog DAS and digital signal processing in the digital DAS). Accordingly, each RU 140-*n* transmits relay signals to mobile communication terminals in its own service coverage through a service antenna. An operation of the RU 140-*n* will be described in detail below.

In FIG. 1, it is illustrated that the BTS 110 and the BIU 120 are connected through an RF cable, the BIU 120 and the MU 130 are connected through an RF cable, and all node units from the MU 130 to lower node units thereof are connected through optical cables. However, a signal transport medium between node units may be variously modified. As an example, the BIU 120 and the MU 130 may be connected through an RF cable, but may be connected through an optical cable or a digital interface. As another example, the MU 130 and HUB 150 may be connected through an optical cable, the MU 130 and the RU 140-*n* directly connected thereto may be connected through an optical cable, and the cascade-connected RUs 140-*n* may be connected through an RF cable, a twist cable, a UTP cable, etc. As still another example, the MU 130 and the RU 140-*n* directly connected thereto may also connected to the MU 20 through an RF cable, a twist cable, a UTP cable, etc.

In FIG. 1, it is illustrated that the BIU 120 is located between the BTS 110 and the MU 130. However, the BIU 120 may be formed as a functional part of the MU 130. When the signal input from the BTS 110 is not a signal with high power, the BIU 120 may be omitted. The BIU 120 is not implemented as a separated device as shown in FIG. 1, and may be implemented as a functional part in the MU 130. In this case, the MU 130 may convert RF signal with high power into RF signal with low power and then combine the converted RF signals with low power for each frequency band (or each provider or each sector).

Hereinafter, this will be described based on FIG. 1. Therefore, in this embodiment, each of the MU 130, the HUB 150, and the RUs 140-*n* may include an optical transceiver module for electrical-to-optical (E/O) conversion/optical-to-electrical (O/E) conversion. When node units are connected through a single optical cable, each of the MU 130, the HUB 150, and the RUs 140-*n* may include a wavelength division multiplexing (WDM) element.

Figure 2:
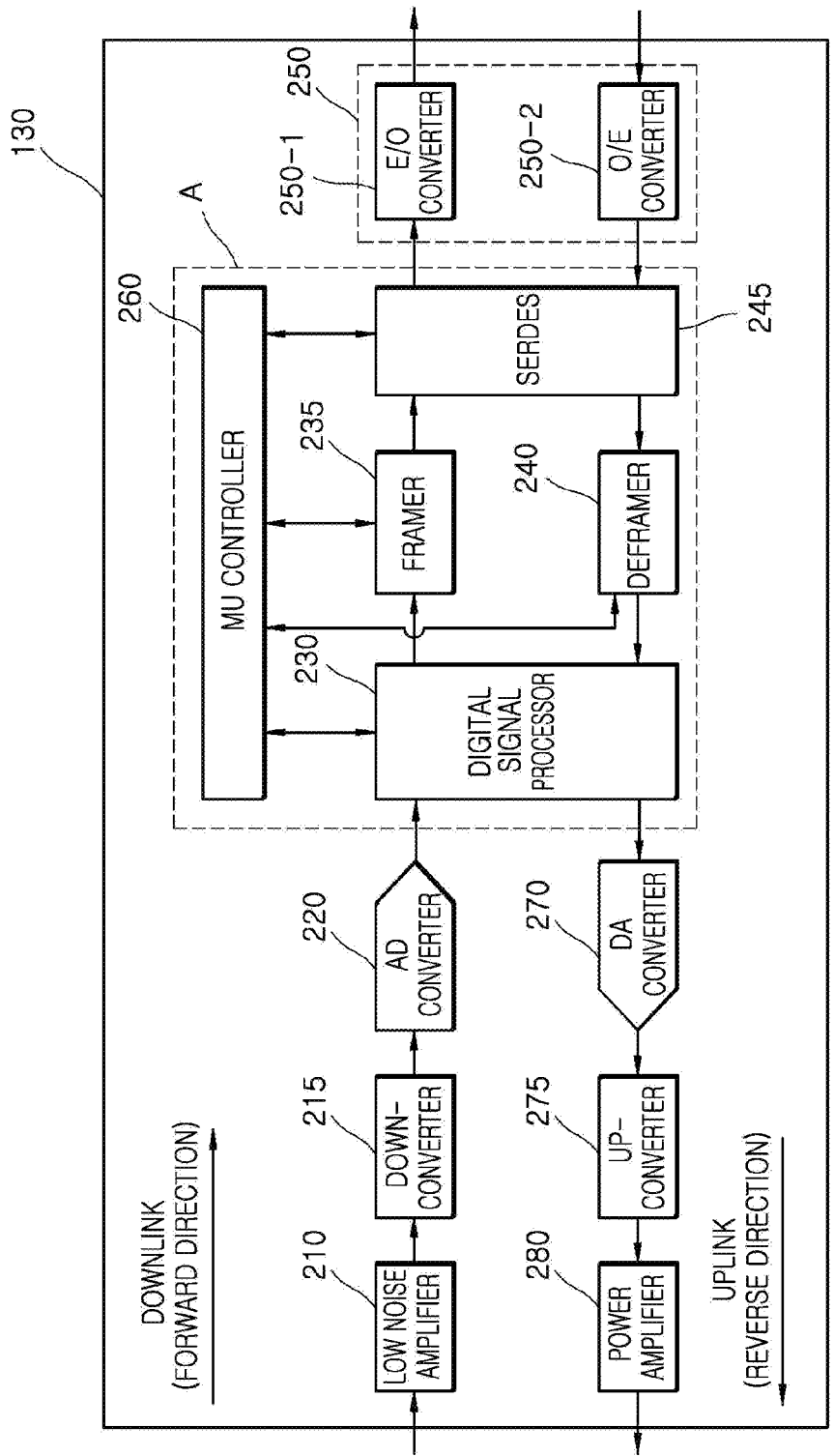
FIG. 2 is a block diagram illustrating an embodiment of a master unit in the DAS to which the inventive concept is applicable.

FIG. 2 is a block diagram illustrating an embodiment of an MU in the DAS to which the inventive concept is applicable.

Here, the block diagram of FIG. 2 illustrates a case where the MU 130 is connected to the BIU 120 through an RF cable and connected to the HUB 150 or the RU 140-*n* through an optical cable. Also, the block diagram of FIG. 2 illustrates only components related to a function transmitting service signals to the HUB 150 or the RU 140-*n* through a forward path and processing the signals received from the HUB 150 or the RU 140-*n* through a reverse path.

Referring to FIG. 2, based on a downlink signal transmission path (i.e., a forward path), the MU 130 may include a low noise amplifier 210, a down-converter 215, an analog-to-digital (AD) converter 220, a digital signal processor 230, a framer 235, a serializer/deserializer (SERDES) 245, an E/O converter 250-1.

In the forward path, an RF signal transmitted through an RF cable is low-noise amplified by the low noise amplifier 210 and then frequency down-converted into an IF signal by the down-converter 215. The converted IF signal is converted into a discrete signal (having a concept including a general digital signal) by the AD converter 220 to be transmitted to the digital signal processor 230 (it will be apparent that the RF signal is not converted into the IF signal but may be directly converted into the discrete signal to be transmitted to the digital signal processor 230).

The digital signal processor 230 performs functions including digital signal processing on relay signals for each frequency band, digital filtering, gain control, digital multiplexing, etc. The discrete signal passing through the digital signal processor 230 is formatted in a format suitable for digital transmission through the framer 235, converted into a serial discrete signal by the SERDES 245, and converted into an optical discrete signal by the E/O converter 250-1 in a signal input/output unit 250, to be transmitted to lower node units (e.g., the RU 140-*n* and/or the HUB 150, etc.) through the optical cable.

Meanwhile, based on an uplink signal transmission path (i.e., a reverse path), the MU 130 may include an O/E converter 250-2, the SERDES 245, a deframer 240, the digital signal processor 230, a digital-to-analog (DA) converter 270, an up-converter 275, and a power amplifier 280.

In the reverse path, an optical relay signal digital-transmitted through an optical cable is converted into an electrical signal (serial discrete signal) by the O/E converter 250-2 in the signal input/output unit 250, the serial discrete signal is converted into a parallel discrete signal by the SERDES 245, and the parallel discrete signal is reformatted by the deframer 240 to be processed for each frequency band in the digital signal processor 230. The discrete signal passing through the digital signal processor 230 is converted into an analog signal via the DA converter 270 connected to the final node unit of a digital part A. Since the analog signal is an IF signal, the analog signal is frequency up-converted into an analog signal in the original RF band through the up-converter 275 (when the RF signal is directly converted into the discrete signal to be transmitted to the digital signal processor 230, the frequency up-conversion operation may be omitted). The analog signal (i.e., the RF signal) converted into the analog signal in the original RF band is amplified by the power amplifier 280 to be transmitted to the BIU 120 through the RF cable.

In FIG. 2, at least one of the digital signal processor 230, the framer 235, the deframer 240, and the SERDES 245 may be implemented in a field programmable gate array (FPGA), and an MU controller 260 may be implemented in the FPGA or may be implemented as a separate device. The digital signal processor 230, the framer 235, the deframer 240, the SERDES 245, and the MU controller 260 may constitute the digital part A for processing digital signals. Although it is illustrated in that the digital signal processor 230 and the SERDES 245 are commonly used in the downlink and uplink transmission paths, the digital signal processor 230 and the SERDES 245 may be separately provided for each path. In FIG. 2, it is illustrated that the E/O converter 250-1 and the OLE converter 250-2 are provided separately from each other. However, the E/O converter 250-1 and the OLE converter 250-2 may be implemented as a single optical transceiver module (e.g., a single small form factor pluggable (SFP)).

In FIG. 2, it is illustrated that the MU 130 includes the power amplifier 280 and the up-converter 275. However, when the BIU 120 includes a unit for converting a high-power RF signal into a low-power RF signal or a unit for converting a low-power RF signal into an IF signal, performing digital signal processing on the converted IF signal, and then combining the digital signal processed signal (or directly performing digital signal processing on the low-power RF signal and combining the digital signal processed signal) as described above, the power amplifier 280 or the up-converter 275 may be omitted. Similarly, the low noise amplifier 210 or the down-converter 215 may also be omitted corresponding to a configuration of the BIU 120.

Although not mentioned in the description of the downlink and uplink signal paths, the MU 130 may further include the MU controller 260. The MU controller 260 may be configured to transmit/receive signals to/from the digital signal processor 230, the framer 235, the deframer 240, the SERDES 245, etc., to control overall operations of the MU 130 or transmit control signals to the HUB 150 or the RU 140-n. Particularly, the MU controller 260 may control signal conversion of a node unit such as the digital signal processor 230, the framer 235, the deframer 240, or the SERDES 245, corresponding to the kind of signal transmitted therefrom. The signal received to an antenna of the final node unit of BTS 110 or the RU 140-n may be a signal such as CDMA, WCDMA, LTE, or WiBro. The MU controller 260 may determine a kind of the transmitted signal, and control a node unit inside the MU 130 or transmit, to a lower node unit, a command for controlling a node unit inside the HUB 150 or the RU 140-n, corresponding to the determined kind.

Meanwhile, the digital signal processor 230 may process, as one signal, n uplink signals received from n RUs 140-n and/or uplink signals received from the HUB 150. A discrete signal (hereinafter, referred to as a 'transmission target uplink signal') obtained by processing a plurality of uplink signals as one signal may be converted into an analog signal by the DA converter 270 and then transmitted to the BTS 110. An operation in which the digital signal processor 230 outputs a transmission target uplink signal will be described later with reference to FIG. 5, etc.

Figure 3:
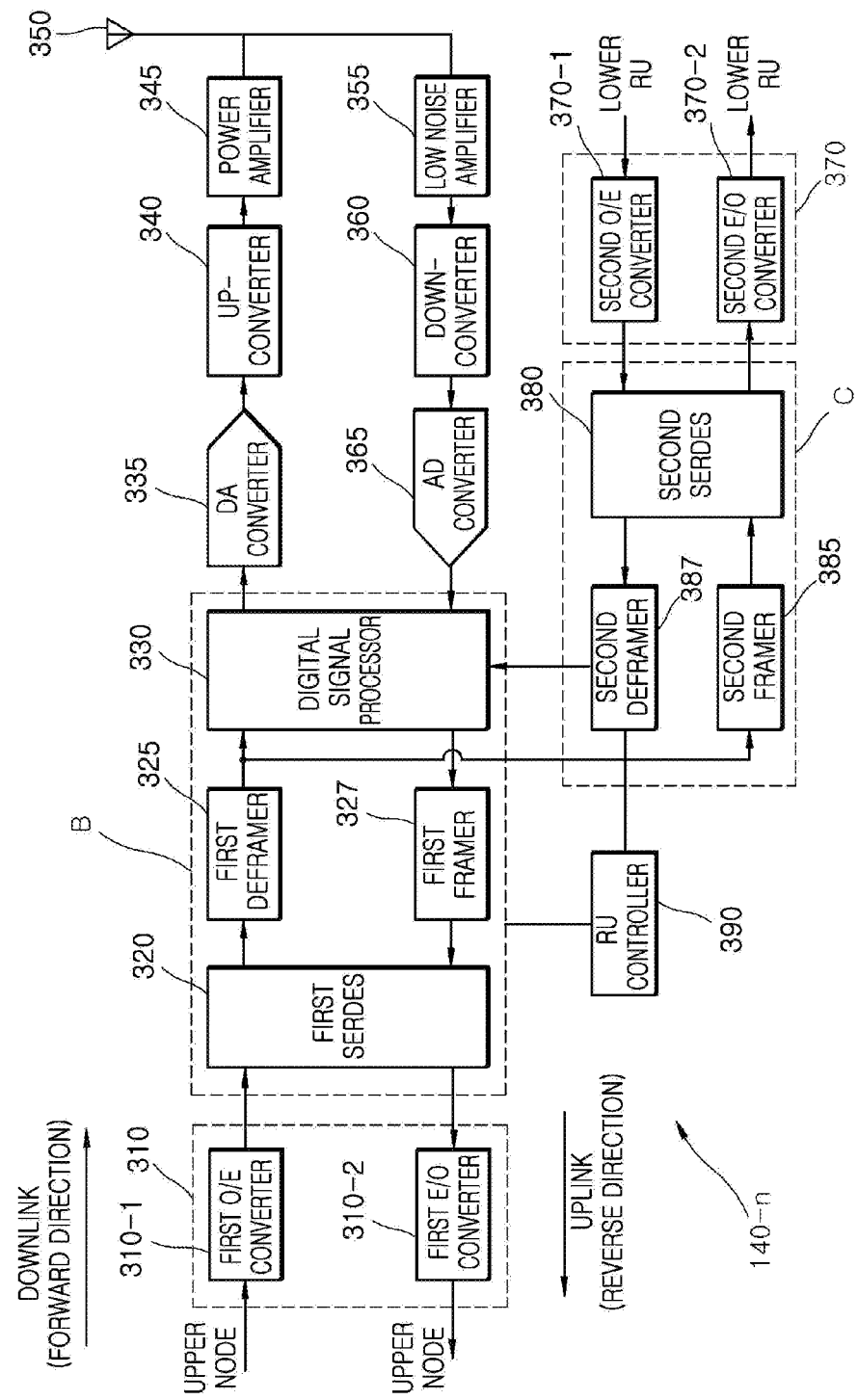
FIG. 3 is a block diagram illustrating an embodiment of a remote unit in the DAS to which the inventive concept is applicable.

FIG. 3 is a block diagram illustrating an embodiment of the RU in the DAS to which the inventive concept is applicable.

Here, the block diagram of FIG. 3 illustrates an implementation form of the RU 140-n in the digital DAS in which connection between nodes are made through optical cables. In addition, the block diagram of FIG. 3 illustrates some components related to a function of providing service signals to a terminal in service coverage through a downlink path and processing terminal signals received from the terminal in the service coverage through an uplink path.

Referring to FIG. 3, based on a downlink signal transmission path (i.e., a forward path, the RU 140-n may include a first O/E converter 310-1, a first SERDES 320, a first deframer 325, a second framer 385, a second SERDES 380, a second E/O converter 370-2, a digital signal processor 330, a DA converter 335, an up-converter 340, and a power amplifier 345.

In the forward path, an optical relay signal digital-transmitted through an optical cable is converted into an electrical signal (serial discrete signal) by the first OLE converter 310-1, the serial discrete signal is converted into a parallel discrete signal by the first SERDES 320, and the parallel discrete signal is reformatted by the first deframer 325 to be processed for each frequency band in the digital signal processor 330. The digital signal processor 330 performs functions including digital signal processing on relay signals for each frequency band, digital filtering, gain control, digital multiplexing, etc. The discrete signal passing through the digital signal processor 330 is converted into an analog signal by the DA converter 335. In this case, when the analog signal is an IF signal, the analog signal may be frequency up-converted into an analog signal in the original RF band through the up-converter 340 (when the analog signal is an RF signal, the frequency up-conversion operation may be omitted). The analog signal (i.e., the RF signal) converted into the analog signal in the original RF band is amplified by the power amplifier 354 to be transmitted through a service antenna 350.

Meanwhile, in the forward path, the RU 140-n may output, to the second framer 385, the signal reformatted by the first deframer 325, to transmit a downlink signal to another unit of a lower node (e.g., the RU 140-2, the HUB 150, etc.) connected to the RU 140-n through an optical cable. For example, the signal reformatted by the first deframer 325 may be output to the second framer 385, and the second framer 385 may again format the reformatted signal to be output to the second SERDES 380. The second SERDES 380 may convert the input signal into a serial discrete signal to be output to the second E/O converter 370-2, and the second E/O converter 370-2 may convert the input signal into an optical discrete signal to be transmitted to the another unit of the lower node through an optical cable.

Based on an uplink signal transmission path (i.e., a reverse path), the RU 140-n may include a low noise amplifier 355, a down-converter 360, an AD converter 365, the digital signal processor 330, a first framer 327, the first SERDES 320, and a first E/O converter 310-1. Also, in the uplink signal transmission path, the RU 140-n may include a second OLE converter 370-1, the second SERDES 380, and a second deframer 387, which process an uplink signal received from another unit of a lower node.

In the reverse path, an RF signal (i.e., a terminal signal) received through the service antenna 350 from a mobile communication terminal (not shown) in a service coverage is low-noise amplified by the low noise amplifier 355, and frequency down-converted into an IF signal by the down-converter 360. The converted IF signal is converted into a discrete signal by the AD 365 to be transmitted to the digital signal processor 330 (the RF signal may be directly transmitted to the digital signal processor 330). Hereinafter, the terminal signal converted into the discrete signal is referred to as an uplink signal. Therefore, the uplink signal may be a signal obtained by converting the terminal signal received through the service antenna 350 into the discrete signal through the AD converter 365. The uplink signal digital subjected to the digital signal processing by the digital signal processor 330 is formatted in a format suitable for digital transmission through the first framer 327, converted into a serial discrete signal by the first SERDES 320, and converted in an optical discrete signal by the first E/O converter 310-2 to be transmitted to an upper node through an optical cable.

Meanwhile, in the reverse path, the uplink signal received from the another unit of the lower node through the optical cable (hereinafter, in order to distinguish an uplink signal received through the service antenna 350 from an uplink signal received from the another node unit, the former is referred to as a 'first uplink signal' and the latter is referred to as a 'second uplink signal') is converted into an electrical signal (serial discrete signal) by the second OLE converter 370-1, the serial discrete signal is converted into a parallel discrete signal by the second SERDES 380, and the parallel discrete signal is reformatted by the second deframer 387 to be output to the digital signal processor 330.

The digital signal processor 330 may process the first and second uplink signals as one signal. A discrete signal (i.e., a 'transmission target uplink signal') obtained by processing the first and second uplink signals as one signal, as described above, is formatted in a format suitable for digital transmission through the first framer 327, converted into a serial discrete signal by the first SERDES 320, and converted into an optical discrete signal by the first E/O converter 310-2 to be transmitted to an upper node through an optical cable. An operation in which the digital signal processor 330 outputs a transmission target uplink signal will be described with reference to FIG. 5, etc.

Figure 4:
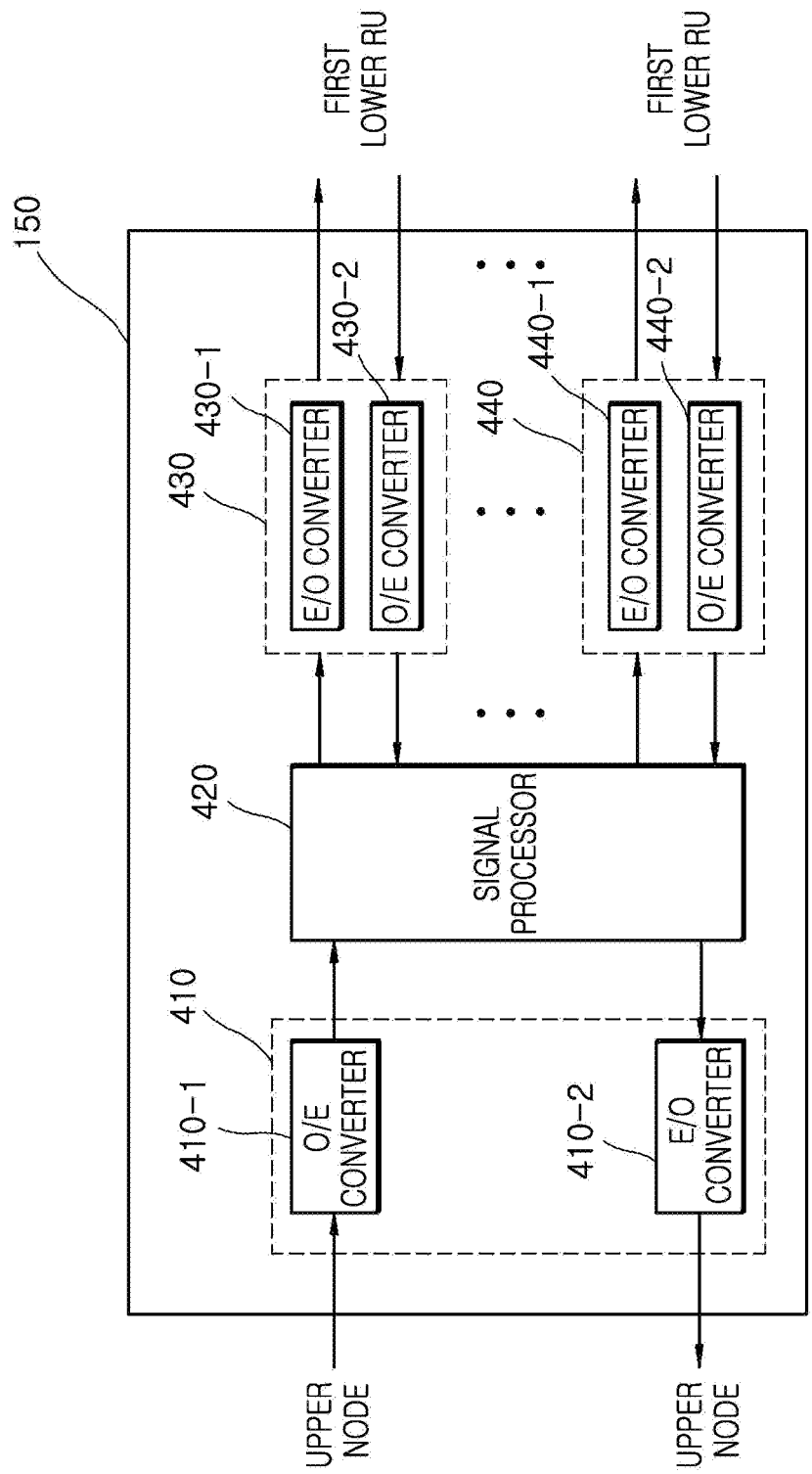
FIG. 4 is a block diagram illustrating an embodiment of a hub unit in the DAS to which the inventive concept is applicable.

FIG. 4 is a block diagram illustrating an embodiment of the HUB in the DAS to which the inventive concept is applicable.

Referring to FIG. 4, based on a downlink signal transmission path, the HUB 150 includes an OLE converter 410-1, a signal processor 420, and a plurality of E/O converters 430-1 and 440-1. An optical relay signal transmitted through an optical cable from the MU 130 is converted into an electrical signal by the OLE converter 410-1, and the signal processor 420 repeats the converted electrical signal into a plurality of electrical signals and transmits the plurality of electrical signals to the respective E/O converters 430-1 and 440-1. Each of the plurality of E/O converters 430-1 and 440-1 receives the repeated electrical signal, converted the electrical signal into an optical relay signal, and transmits the optical relay signal to the RU 140-n that is a lower node unit. For convenience of illustration, only two E/O converters 430-1 and 440-1 are illustrated in FIG. 4. However, the E/O converter may be provided in plurality corresponding to the number of the RUs 140-n.

Based on an uplink signal transmission path, the HUB 150 includes a plurality of OLE converters 430-2 and 440-2, the signal processor 420, and an E/O converter 410-2. An optical relay signal transmitted from the RU 140-n through an optical cable is converted into uplink signals by the O/E converters 430-2 and 440-2. The signal processor 420 processes the converted uplink signals as one signal and transmits the processed signal to the E/O converter 410-2. The E/O converter 410-2 converts an electrical signal (i.e., a transmission target uplink signal) processed as the one signal into an optical relay signal and transmits the converted optical relay signal to the MU 130 that is an upper node. An operation in which the signal processor 420 generates and outputs a transmission target uplink signal will be described later with reference to FIG. 5, etc.

Meanwhile, it is illustrated in FIG. 4 that the OE converters 410-1, 430-2, and 440-2 and the E/O converters 410-2, 430-1, and 440-1 are configured separately from each other. However, the O/E converter and the E/O converter, which correspond to each other, among the OE converters 410-1, 430-2, and 440-2 and the E/O converters 410-2, 430-1, and 440-1 may be configured as a single optical transceiver module 410, 430, or 440.

Figure 5:
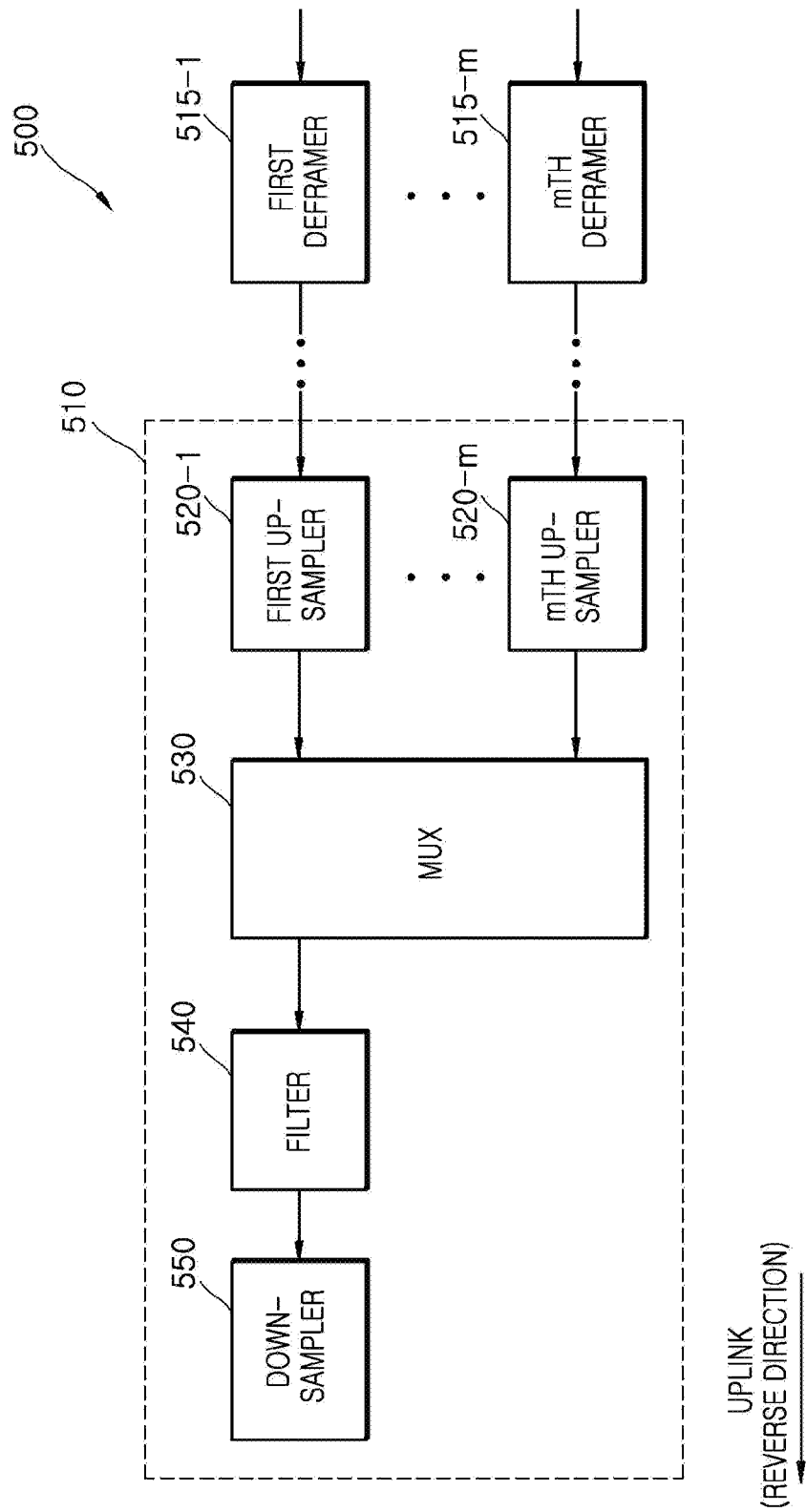
FIG. 5 is a diagram illustrating an operation in which a node unit constituting the DAS outputs a transmission target uplink signal according to an embodiment of the inventive concept.

FIG. 5 is a diagram illustrating an operation in which a node unit constituting the DAS outputs a transmission target uplink signal according to an embodiment of the inventive concept.

Referring to FIG. 5, there is illustrated a signal processing unit 510 included in each of the node units i.e., the MU 130, the RU 140-n and/or the HUB 150, constituting the DAS 100 according to the embodiment of the inventive concept. The signal processing unit 510 may include first to mth up-samplers 520-1 to 520-m (m is a natural number of 2 or more), a multiplexer (MUX) 530, a filter 540, and a down-sampler 550. In this case, m uplink signals may be received to each node unit included in the signal processing unit 510 through m paths, and the m uplink signals may be input to the m up-samplers 520-1 to 520-m, respectively.

For example, in the MU 130, the signal processing unit 510 may be included in the digital processing unit 230. Therefore, the m uplink signals received through the m paths may be respectively reformatted by m deframers 515-1 to 515-m to be processed for each frequency band in the digital signal processor 230, and each of the reformatted uplink signals may be then input to a corresponding mth up-sampler 520-m. For example, it is assumed that three uplink signals are received to the MU 130 from the first RU 140-1, the second RU 140-2, and the HUB 150. In this case, the signal processing unit 510 may include three up-samplers (i.e., the first up-sampler 520-1, the second up-sampler 520-2, and the third up-sampler 520-3). Therefore, the uplink signal received from the first RU 140-1 may be input to the first up-sampler 520-1, the uplink signal received from the second RU 140-2 may be input to the second up-sampler 520-2, and the uplink signal received from the HUB 150 may be input to the third up-sampler 520-3.

In the RU 140-n, the signal processing unit 510 may be included in the digital signal processor 330. Therefore, a first uplink signal received from the service antenna 350 and a second uplink signal received from another lower node unit may be respectively reformatted by two deframers 515-1 and 515-2 to be processed for each frequency band in the digital signal processor 330, and the first and second uplink signals may be then input to the first up-sampler 520-1 and the second up-sampler 520-2, respectively.

In the HUB 150, the signal processing unit 510 may be included in the signal processor 420. Therefore, each of m uplink signals received to the HUB 150 through m paths may be input to a corresponding mth up-sampler 520-m. For example, it is assumed that three uplink signals are received to the HUB 150 from the first RU 140-1, the second RU 140-2, and the third RU 140-3. In this case, the signal processing unit 510 may include three up-samplers (i.e., the first up-sampler 520-1, the second up-sampler 520-2, and the third up-sampler 520-3). Therefore, the uplink signal received from the first RU 140-1 may be input to the first up-sampler 520-1, the uplink signal received from the second RU 140-2 may be input to the second up-sampler 520-2, and the uplink signal received from the HUB 150 may be input to the third up-sampler 520-3.

Hereinafter, an operation of each component included in the signal processing unit 510 will be described in detail.

Figure 6:
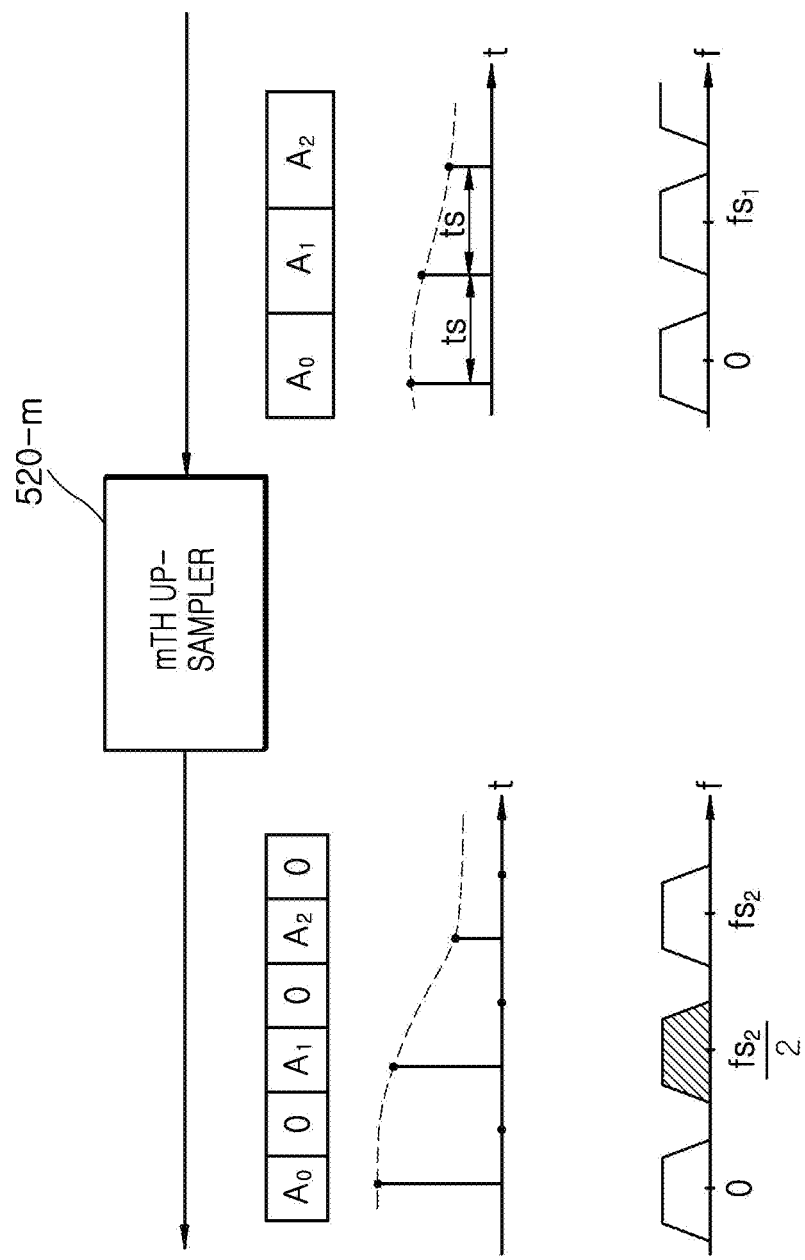
FIG. 6 is a diagram illustrating an operation of an up-sampler according to an embodiment of the inventive concept.

FIG. 6 is a diagram illustrating an operation of the up-sampler according to an embodiment of the inventive concept.

Referring to FIG. 6, a case where an mth uplink signal is input to the mth up-sampler 520-m is illustrated. The mth uplink signal may be a discrete signal corresponding to [$A_0$ $A_1$ $A_2$]. Also, the mth uplink signal may be a signal sampled in accordance with a predetermined sampling period (hereinafter, referred to as a 'sampling period ts'). Therefore, if the mth uplink signal is represented in a frequency region, as shown in FIG. 6, a signal waveform represented in the frequency region of the original signal (i.e., the analog signal of the mth uplink signal) may be repeated for every period of a sampling frequency fs1.

If the mth uplink signal is input, the mth up-sampler 520-$m$ may generate an mth up-sampling signal by up-sampling the mth uplink signal according to a predetermined sampling rate (hereinafter, referred to as an 'up-sampling rate'). For example, the mth up-sampler 520-$m$ may generate an up-sampling signal by inserting invalid sample information (e.g., '0,' '1,' or an arbitrary number) corresponding to the up-sampling signal between valid sample information (i.e., $[A_0 \, A_1 \, A_2]$. It is assumed that the up-sampling rate is set to be twice greater than the sampling rate, and the invalid sample information is set to '0' (i.e., when the number of input m uplink signals is 2 (m=2)). In this case, if $[A_0 \, A_1 \, A_2]$ is input, the mth up-sampler 520-$m$ may generate, as the up-sampling signal, a signal corresponding to $[A_0 \, 0 \, A_1 \, 0 \, A_2 \, 0]$. Similarly, it is assumed that the up-sampling rate is set to be three times greater than the sampling rate, and the invalid sample information is set to '1.' In this case, if $[A_0 \, A_1 \, A_2]$ is input, the mth up-sampler 520-$m$ may generate, as the up-sampling signal, a signal corresponding to $[A_0 \, 1 \, 1 \, A_1 \, 1 \, 1 \, A_2 \, 1 \, 1]$.

Meanwhile, when m uplink signals are selectively processed, the invalid sample information may be configured with (m−1) or more sample information. For example, it is assumed that five uplink signals are received to each node unit including the signal processing unit 510 through five paths. In this case, the invalid sample information may be configured with four or more sample information. If it is assumed that the invalid sample information is set to '0,' the mth up-sampler 520-$m$ may generate an mth up-sampling signal by inserting [0000] between the invalid sample information. For example, the mth up-sampler 520-$m$ may output $[A_0 \, 0000 \, A_1 \, 0000 \, A_2 \, 0000]$, corresponding to an input of $[A_0 \, A_1 \, A_2]$.

The mth up-sampling signal is a signal up-sampled by inserting invalid sample information between valid sample information thereof. Therefore, if the mth uplink signal is represented in the frequency region, as shown in FIG. 6, a signal waveform represented in the frequency region of the original signal (i.e., the analog signal of the mth uplink signal) may be repeated for every period of an up-sampling frequency fs1*m, and an image signal may be repeated for every period of (2p−1)fs2/2 (p is a natural number) in the up-sampling frequency fs1*m. For example, in FIG. 6, the image signal may be repeated at frequencies of fs2/2, 3fs2/2, 5fs2/2, . . . . It is apparent to those skilled in the art that the image signal is repeated in the generation of the mth up-sampling signal, and therefore, its detailed description will be omitted.

The mth up-sampling signal generated by the mth up-sampler 520-$m$ may be output to the MUX 530. Hereinafter, an operation of the MUX 530 according to an embodiment of the inventive concept will be described in detail with reference to FIG. 7.

Figure 7:
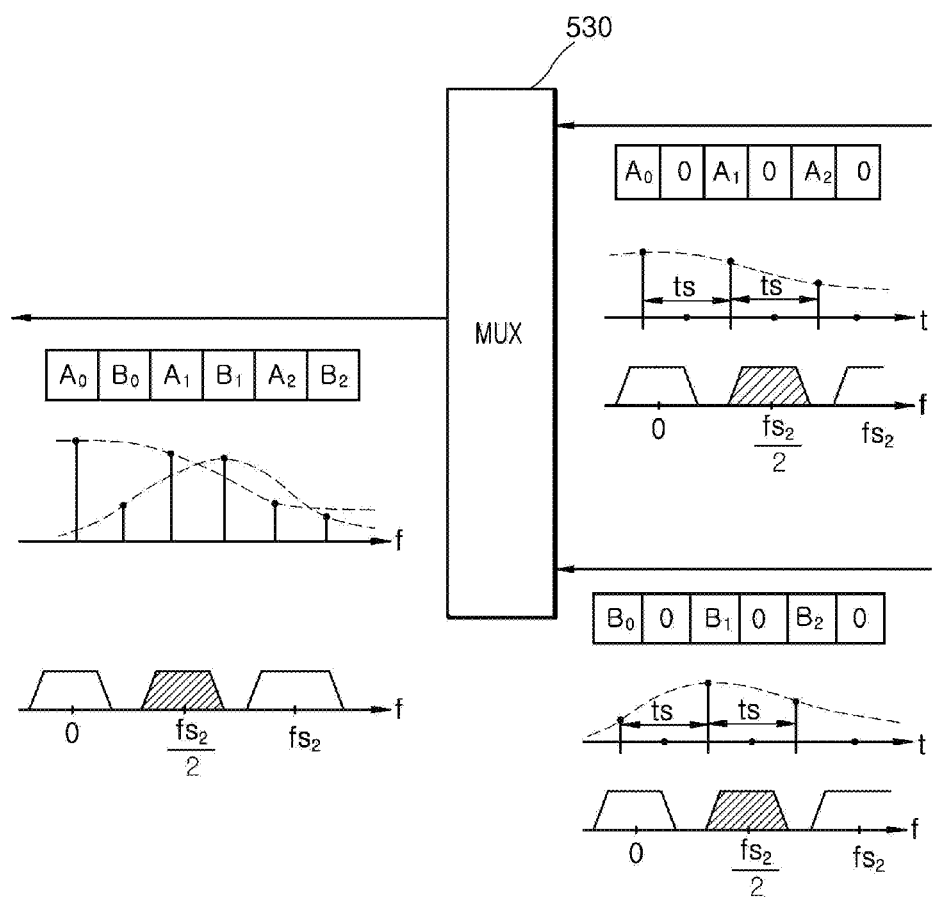
FIG. 7 is a diagram illustrating an operation of a multiplexer according to an embodiment of the inventive concept.

FIG. 7 is a diagram illustrating an operation of the MUX according to an embodiment of the inventive concept.

The MUX 530 may generate one signal (hereinafter, referred to as a 'single uplink signal') by repeating an operation of selectively outputting m up-sampling signals input at an interval of a predetermined time (hereinafter, referred to as an 'output time'). Referring to FIG. 7, there is illustrated a case where two up-sampling signals (i.e., a first up-sampling signal and a second up-sampling signal) are input to the MUX 530. Here, the first up-sampling signal corresponds to $[A_0 \, 0 \, A_1 \, 0 \, A_2 \, 0]$, and the second up-sampling signal corresponds to $[B_0 \, 0 \, B_1 \, 0 \, B_2 \, 0]$. Therefore, the MUX 530 may output a single uplink signal corresponding to $[A_0 \, B_0 \, A_1 \, B_1 \, A_2 \, B_2]$ by selectively outputting the first up-sampling signal and the second up-sampling signal at an interval of an output time.

For example, it is assumed that the output time is set to a time obtained by dividing m into the sampling period ts (i.e., ts/2 in FIG. 7). In this case, the MUX 530 may first output the first up-sampling signal and then output the second up-sampling signal when the output time elapses. For example, the MUX 530 may first output $[A_0]$ of the first up-sampling signal and then output $[B_0]$ of the second up-sampling signal when the output time elapses. After that, if the output time elapses, the MUX 530 may again output the first up-sampling signal. In this case, since a time twice greater than the output time has elapsed after $[A_0]$ is output, [0] corresponding to the invalid sample information is not output, but $[A_1]$ corresponding to the valid sample information may be output. After that, if the output time elapses, the MUX 530 may again output the second up-sampling signal. In this case, since a time twice greater than the output time has elapsed after $[B_0]$ is output, [0] corresponding to the invalid sample information is not output, but $[B_1]$ corresponding to the valid sample information may be output. In this manner, the MUX 530 may output the single uplink signal corresponding to $[A_0 \, B_0 \, A_1 \, B_1 \, A_2 \, B_2]$ by alternatively outputting the first up-sampling signal and the second up-sampling signal.

Therefore, the output time may be previously set to be equal to or less than a time obtained by dividing the number (i.e., m) of input uplink signals into the sampling period ts. In FIG. 7, it is illustrated that the number of input uplink signals is two. However, when the number of input uplink signals is three, the output time may be set to be equal to or less than ts/3, and the MUX 530 may output a single uplink signal corresponding to $[A_0 \, B_0 \, C_0 \, A_1 \, B_1 \, C_1 \, A_2 \, B_2 \, C_2]$ (when a third uplink signal is $[C_0 \, C_1 \, C_2]$). In FIG. 7, it is illustrated that the first up-sampling signal is first output and the second up-sampling signal is then output. However, the second up-sampling signal may be first output and the first up-sampling signal may be then output. Therefore, the order in which the MUX 530 outputs the input m up-sampling signals is not limited to the scope of the inventive concept.

Meanwhile, since the generated single uplink signal is a signal generated by selectively outputting the first up-sampling signal and the second up-sampling signal, the sampling rate of the single uplink signal may be equal to or greater than the same value as the up-sampling rate, i.e., the value obtained by multiplying the sampling rate by m. If the waveform of the single uplink signal is represented in the frequency region, like waveforms of the first and second up-sampling signals, an image signal may be repeated for every period of (2p−1)fs2/2. Hereinafter, an operation in which the generated single uplink signal is input to the filter 540 to eliminate the image signal, and is input to the down-sampler 550 to be downsample will be described with reference to FIG. 8.

Figure 8:
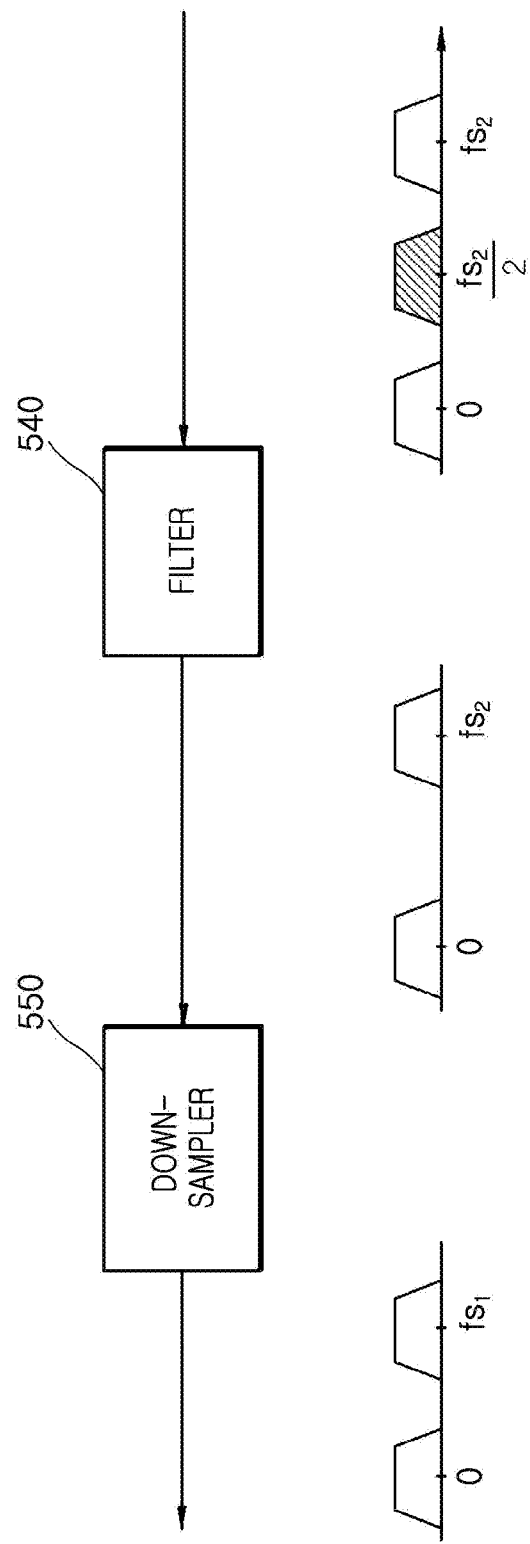
FIG. 8 is a diagram illustrating operations of a filter and a down-sampler according to an embodiment of the inventive concept.

FIG. 8 is a diagram illustrating operations of the filter and the down-sampler according to an embodiment of the inventive concept.

Referring to FIG. 8, a single uplink signal is input to the filter 540 to eliminate an image signal, and is downsampled through the down-sampler 550. The filter 540 may eliminate the image signal included in the input single uplink signal.

For example, the filter 540 may eliminate the image signal repeated for every period of (2p−1)fs2/2 in the single uplink signal. Then, the filter 540 may output the single uplink signal as an image eliminated signal.

The image eliminated signal may be input to the down-sampler 550. The down-sampler 550 may convert a sampling rate of image eliminated signal. For example, the down-sampler 550 may convert the sampling rate of the image eliminated signal corresponds to a sampling rate of any one of the m uplink signals. Then, the down-sampler 550 may output the image eliminated signal as a transmission target uplink signal. The transmission target uplink signal is transmitted to an upper node unit through the down-sampling, thereby improving transmission efficiency.

In the above, it has been illustrated that the filter 540 and the down-sampler 550 are components separated from each other. However, the filter 540 and the down-sampler 550 may be implemented as one logical and/or physical component.

In the above, the operation has been illustrated, in which the m uplink signals are up-sampled by the respective m up-samplers 520-$m$ and then processed as a single transmission target uplink signal. Hereinafter, an operation in which the m uplink signals are not up-sampled but generated as a single transmission target uplink signal according to another embodiment of the inventive concept will be described with reference to FIG. 9.

Figure 9:
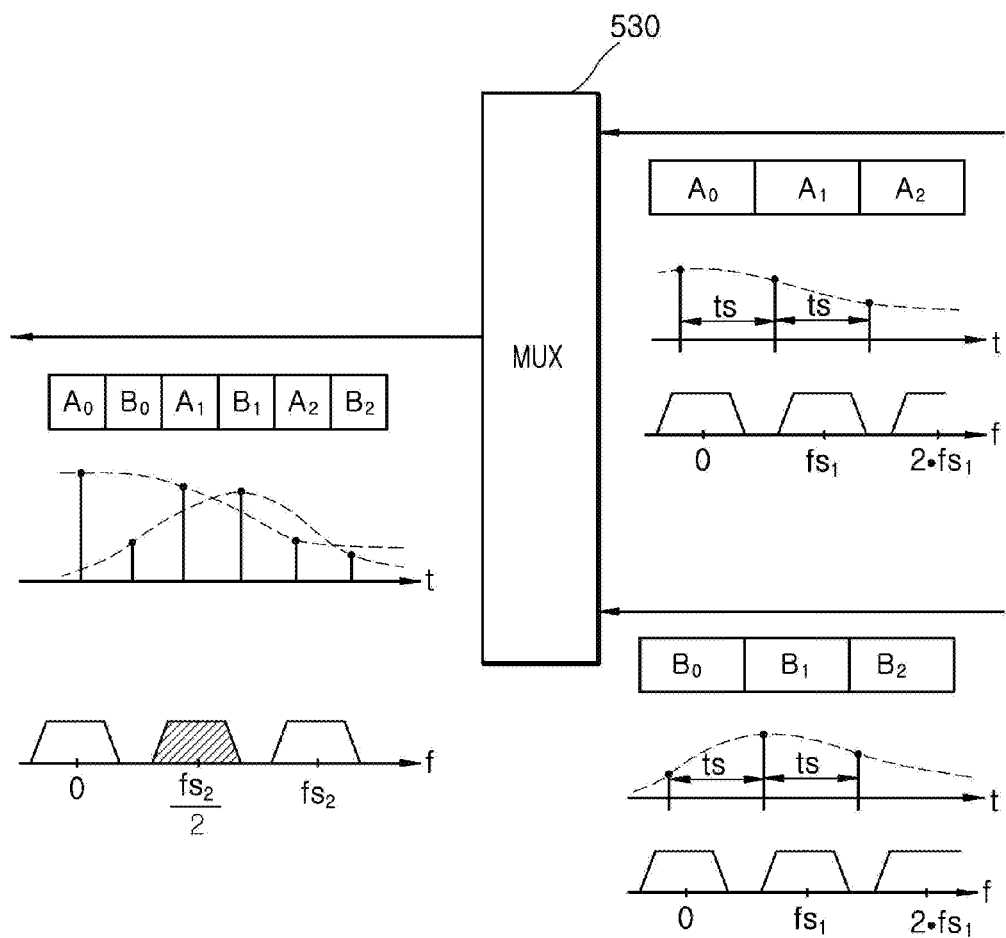
FIG. 9 is a diagram illustrating an operation of the multiplexer according to another embodiment of the inventive concept.

FIG. 9 is a diagram illustrating an operation of the MUX according to another embodiment of the inventive concept.

The m uplink signals are not up-sampled but may be directly input to the MUX 530. Referring to FIG. 9, there is illustrated a case where two uplink signals (i.e., a first uplink signal and a second uplink signal) are input to the MUX 530. Like the above-described embodiment, the first uplink signal may be a discrete signal corresponding to [$A_0$ $A_1$ $A_2$], and the second uplink signal may be a discrete signal corresponding to [$B_0$ $B_1$ $B_2$]. Also, the first uplink signal and the second uplink signal may be signals sampled in accordance with a predetermined sampling period ts. Therefore, if the first uplink signal and the second uplink signal are represented in a frequency region, as shown in FIG. 9, a signal waveform represented in the frequency region of the original signal (i.e., the analog signal of each of the first uplink signal and the second uplink signal) may be repeated for every period of a sampling frequency fs1.

The MUX 530 may output a single uplink signal by selectively outputting any one of the first uplink signal and the second uplink signal at an interval of a predetermined output time. In the embodiment of FIG. 9, the MUX 530 may output a single uplink signal corresponding to [$A_0$ $B_0$ $A_1$ $B_1$ $A_2$ $B_2$] by selectively outputting the first uplink signal and the second uplink signal at the interval of the output time. Here, the output time may be set to a time obtained by dividing 2 into the sampling period ts (i.e., ts/2 in FIG. 9). The MUX 530 may first output the first uplink signal and then output the second uplink signal when the output time elapses. For example, the MUX 530 may first output [$A_0$] of the first uplink signal and then output [$B_0$] of the second uplink signal when the output time elapses. When the first uplink signal and the second uplink signals are simultaneously input, the output time corresponding to the time obtained by dividing 2 into the sampling period. Therefore, if the output time elapses after [$A_0$] of the first uplink signal is output, [$B_0$] of the second uplink signal may be output.

If the output time elapses after [$B_0$] of the second uplink signal is output, the MUX 530 may again output the first uplink signal. In this case, since a time twice greater than the output time has elapsed after [$A_0$] is output, [$A_1$] may be output. In this manner, the MUX 530 may output the single uplink signal corresponding to [$A_0$ $B_0$ $A_1$ $B_1$ $A_2$ $B_2$] by alternatively outputting the first uplink signal and the second uplink signal at the interval of the output time.

Therefore, the output time may be previously set to be equal to or less than a time obtained by dividing a number (i.e., m) of input uplink signals into the sampling period ts. In FIG. 9 it is illustrated that the number of input uplink signals is two. However, when the number of input uplink signals is three, the output time may be set to be equal to or less than ts/3, and the MUX 530 may output a single uplink signal corresponding to [$A_0$ $B_0$ $C_0$ $A_1$ $B_1$ $C_1$ $A_2$ $B_2$ $C_2$] (when a third uplink signal is [$C_0$ $C_1$ $C_2$]). In FIG. 9, it is illustrated that the first uplink signal is first output and the second uplink signal is then output. However, the second uplink signal may be first output and the first uplink signal may be then output. Therefore, the order in which the MUX 530 outputs the input uplink signals is not limited to the scope of the inventive concept.

Meanwhile, the generated single uplink signal is a signal generated by selectively including information of the first uplink signal and the second uplink signal, and corresponds to a signal sampled at an interval of is/m. Therefore, the sampling rate of the single uplink signal may be equal to or greater than the value obtained by multiplying the sampling rate by m. If the waveform of the single uplink signal is represented in the frequency region, an image signal may be repeated for every period of (2p−1)fs2/2.

As described above, the single uplink signal generated without up-sampling according to the embodiment of FIG. 9 may be a signal substantially identical or similar to a single uplink signal generated through up-sampling according to the embodiments of FIGS. 6 and 7. Therefore, the single uplink signal generated without up-sampling may be input to the filter 540 to eliminate an image signal, and may be input to the down-sampler 550 to be downsampled corresponding to a sampling rate of any one of the first uplink signal and second signal.

As such, the m up-samplers 520-$m$ may be included or may not be included in the signal processing unit 510.

Figure 10:
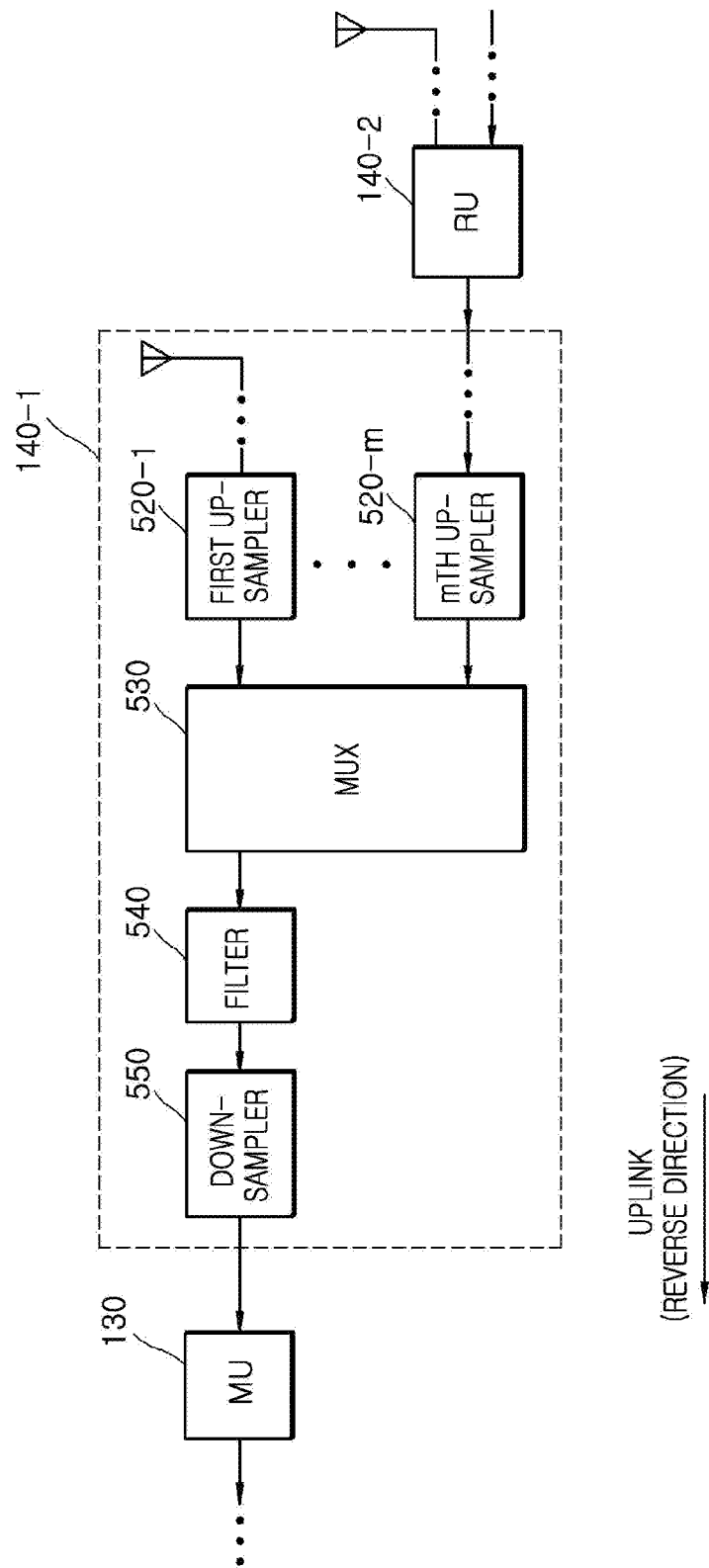
FIG. 10 is a diagram illustrating an operation in which a transmission target uplink signal is generated when a plurality of remote units are connected in series.

FIG. 10 is a diagram illustrating an operation in which a transmission target uplink signal is generated when a plurality of RUs are connected in series.

Referring to FIG. 10, there is illustrated a case where two RUs 140-1 and 140-2 are connected in series to the MU 130. The signal processing unit 510 may be included in each of the two RUs 140-1 and 140-2 (only the signal processing unit 510 of the first RU 140-1 is illustrated in FIG. 10). The signal processing unit 510 of the second RU 140-2 may generate a transmission target uplink signal (in FIG. 10, referred to as a 'second transmission target uplink signal') by selectively processing an uplink signal received from a service antenna and another uplink signal received from lower node unit. For example, the signal processing unit 510 of the second RU 140-2 may generate the second transmission target uplink signal by conducting at least one of an up-sampling operation, a multiplexing operation, an image elimination operation and a down-sampling operation described with reference to FIG. 5 to FIG. 9 for the uplink signals. The second RU 140-2 may transmit the second transmission target uplink signal to the first RU 140-1 connected in series thereto.

The first RU 140-1 may generate a transmission target uplink signal (in FIG. 10, referred to as a 'first transmission target uplink signal') by selectively processing an uplink signal received from a service antenna and the second transmission target uplink signal received from the second RU 140-2. For example, the signal processing unit 510 of the second RU 140-1 may generate the first transmission target uplink signal by conducting at least one of the up-sampling operation, the multiplexing operation, the image elimination operation and the down-sampling operation for the uplink signal and the second transmission target uplink signal. The first RU 140-1 may transmit the first transmission target uplink signal to the MU 130 connected in series thereto.

The MU 130 may process the received first transmission target uplink signal and transmit the processed first transmission target uplink signal to the BTS 110. In FIG. 10, a plurality of RUs 140-*n* are connected in series to the MU 130, and hence a single uplink signal (i.e., the first transmission target uplink signal) is received to the MU 130. Therefore, the signal processing unit 510 may not be included in the MU 130.

Meanwhile, a case where m up-samplers 520-*m* are included in the signal processing unit 510 is illustrated in FIG. 10. However, as described above, the m up-samplers 520-*m* may be omitted in the signal processing unit 510, and m uplink signals may be directly input to the MUX 530 to be processed as the first transmission target uplink signal and/or the second transmission target uplink signal.

Figure 11:
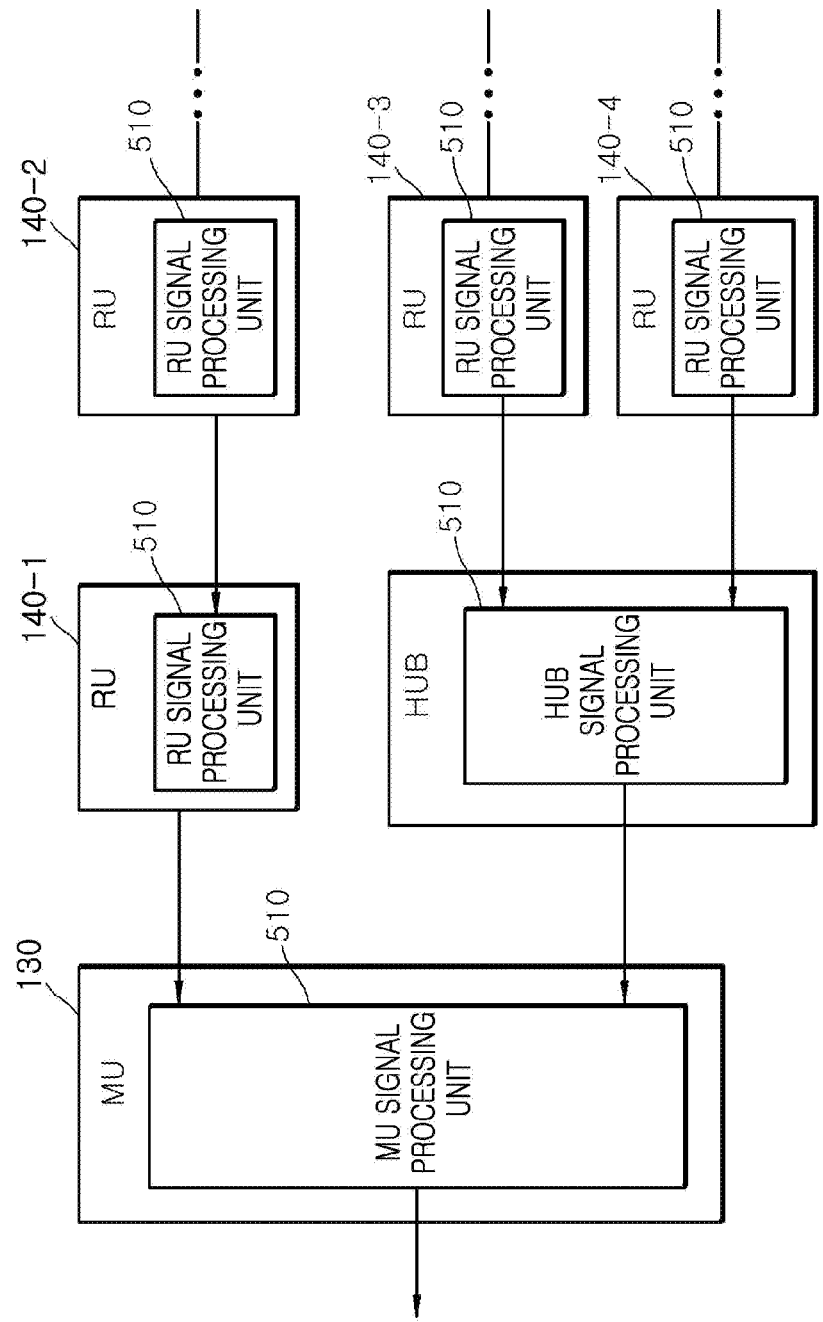
FIG. 11 is a diagram illustrating an operation in which a transmission target uplink signal is generated when a plurality of remote units and a hub unit are connected in series and/or cascade.

FIG. 11 is a diagram illustrating an operation in which a transmission target uplink signal is generated when a plurality of RUs and a HUB are connected in series and/or cascade.

Referring to FIG. 11, there is illustrated a case where the first RU 140-1 and the HUB 150 are connected to the MU 130, the second RU 140-2 is connected in series to the first RU 140-1, and the third RU 140-3 and the fourth RU 140-4 are connected in cascade to the HUB 150. Therefore, the signal processing unit 510 is included in each of the MU 130, the first to fourth RUs 140-1 to 140-4, and the HUB 150.

The second RU 140-2 may output a transmission target uplink signal by selectively processing an uplink signal received from a service antenna and an uplink signal received from another lower node unit. For example, the second RU 140-2 may generate the transmission target uplink signal by conducting at least one of an up-sampling operation, a multiplexing operation, an image elimination operation and a down-sampling operation described with reference to FIG. 5 to FIG. 9 for the uplink signals. The second RU 140-2 may transmit the transmission target uplink signal to the first RU 140-1.

The first RU 140-1 may generate a transmission target uplink signal (hereinafter, referred to as an 'RU transmission target uplink signal' to be distinguished from other transmission target uplink signals) by selectively processing an uplink signal from a service antenna and the transmission target uplink signal received from the second RU 140-2. For example, the first RU 140-1 may generate the RU transmission target uplink signal by conducting at least one of the up-sampling operation, the multiplexing operation, the image elimination operation and the down-sampling operation for the uplink signal and the transmission target uplink signal. The first RU 140-1 may transmit the RU transmission target uplink signal to the MU 130.

The HUB 150 may generate a transmission target uplink signal (hereinafter, referred to as an 'HUB transmission target uplink signal' to be distinguished from other transmission target uplink signals) by selectively processing an uplink signal received from the third RU 140-3 and an uplink signal received from the fourth RU 140-4. For example, the HUB 150 may generate the HUB transmission target uplink signal by conducting at least one of the up-sampling operation, the multiplexing operation, the image elimination operation and the down-sampling operation for the uplink signals. The HUB 150 may transmit the HUB transmission target uplink signal to the MU 130.

The MU 130 may generate a transmission target uplink signal (hereinafter, referred to as an 'MU transmission target uplink signal' to be distinguished from other transmission target uplink signals) by selectively processing the RU transmission target uplink signal received from the first RU 140-1 and the HUB transmission target uplink signal received from the HUB 150. For example, the MU 130 may generate the MU transmission target uplink signal by conducting at least one of the up-sampling operation, the multiplexing operation, the image elimination operation and the down-sampling operation for the RU transmission target uplink signal and the HUB transmission target uplink signal. The MU 130 may transmit the MU transmission target uplink signal to the BTS 110.

As described above, according to the embodiment of the inventive concept, the signal processing unit 510 is included in each of the MU 130, the RU 140-*n*, and the HUB 150, and thus a single transmission target uplink signal can be output by selectively processing a plurality of uplink signals input through a plurality of paths. In FIG. 11, a plurality of signal processing units 510 may be included in each of the MU 130, the RU 140-*n*, and the HUB 150.

Figure 12:
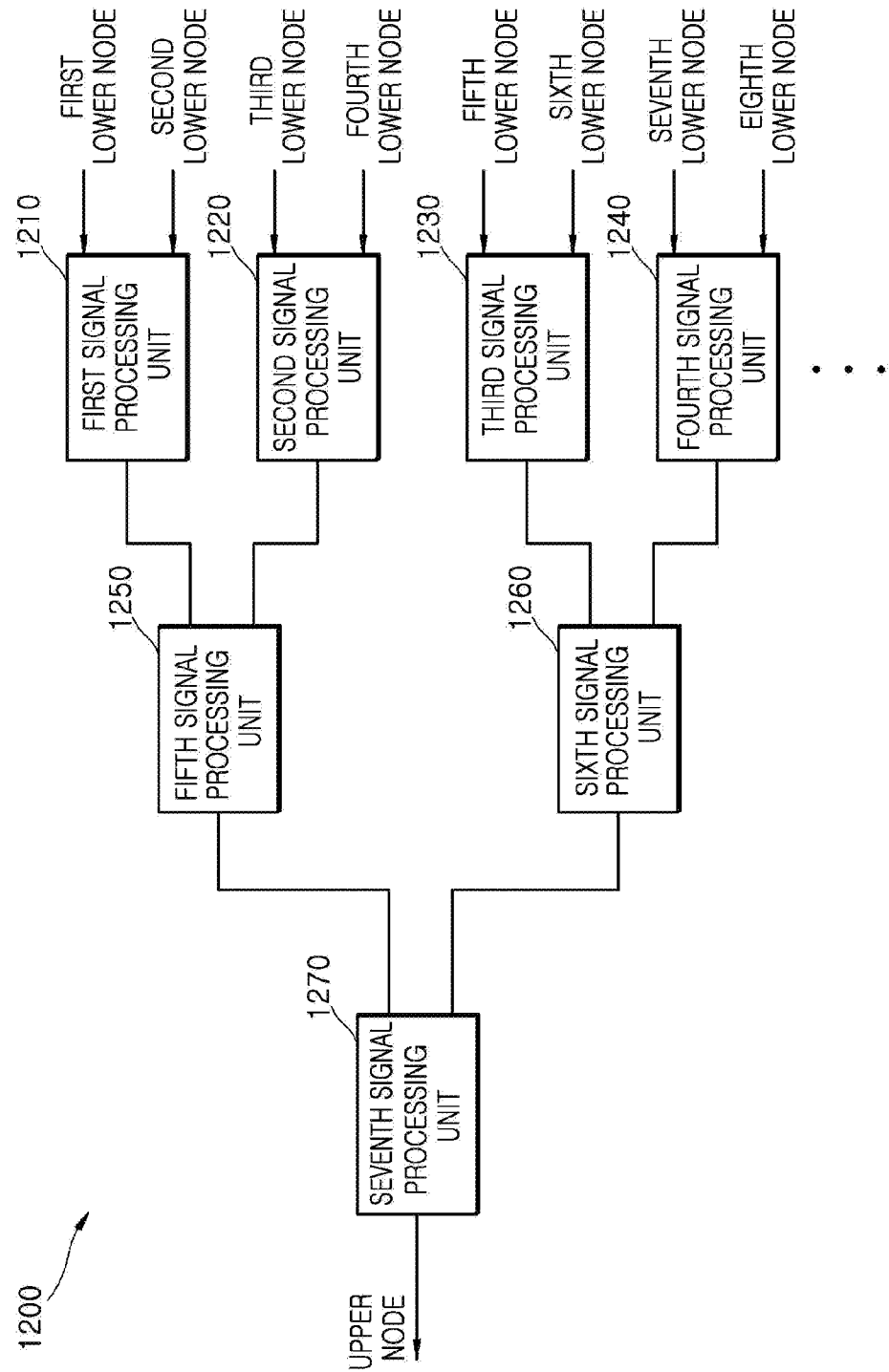
FIG. 12 is a block diagram illustrating a case where a plurality of signal processing units are embodied in one node unit according to an embodiment of the inventive concept.

FIG. 12 is a block diagram illustrating a case where a plurality of signal processing units are embodied in one node unit according to an embodiment of the inventive concept.

Referring to FIG. 12, there is illustrated a case where a plurality of signal processing units 510 are included in each node unit, i.e., the MU 130, the RU 140-*n*, and/or the HUB 150, constituting the DAS 100 according to the embodiment of the inventive concept. For example, when the node unit 1200 of FIG. 12 is the MU 130, first to seventh signal processing units 1210 to 1270 may be included in the MU 130.

The first signal processing unit 1210 may receive a first uplink signal input from a first lower node and receive a second uplink signal input from a second lower node. The first signal processing unit 1210 may generate a transmission target uplink signal (in FIG. 12, referred to as a 'first transmission target uplink signal' to be distinguished from other transmission target uplink signals) by conducting at least one of an up-sampling operation, a multiplexing operation, an image elimination operation and a down-sampling operation described with reference to FIG. 5 to FIG. 9 for the first uplink signal and the second uplink signal.

The second signal processing unit 1220 may receive a third uplink signal input from a third lower node and receive a fourth uplink signal input from a fourth lower node. The second signal processing unit 1220 may generate a transmission target uplink signal (in FIG. 12, referred to as a 'second transmission target uplink signal' to be distinguished from other transmission target uplink signals) by conducting at least one of the up-sampling operation, the multiplexing operation, the image elimination operation and the down-sampling operation for the third uplink signal and the fourth uplink signal.

The third signal processing unit 1230 may receive a fifth uplink signal input from a fifth lower node and receive a sixth uplink signal input from a sixth lower node. The third signal processing unit 1230 may generate a transmission target uplink signal (in FIG. 12, referred to as a 'third transmission target uplink signal' to be distinguished from other transmission target uplink signals) by conducting at least one of the up-sampling operation, the multiplexing operation, the image elimination operation and the down-sampling operation for the fifth uplink signal and the sixth uplink signal.

The fourth signal processing unit 1240 may receive a seventh uplink signal input from a seventh lower node and receive an eighth uplink signal input from an eighth lower node. The fourth signal processing unit 1240 may generate a transmission target uplink signal (in FIG. 12, referred to as a 'fourth transmission target uplink signal' to be distinguished from other transmission target uplink signals) by conducting at least one of the up-sampling operation, the multiplexing operation, the image elimination operation and the down-sampling operation for the seventh uplink signal and the eighth uplink signal.

The fifth signal processing unit 1250 may receive the first transmission target uplink signal input from the first signal processing unit 1210 and receive the second transmission target uplink signal input from the second signal processing unit 1220. The fifth signal processing unit 1250 may generate a transmission target uplink signal (in FIG. 12, referred to as a 'fifth transmission target uplink signal' to be distinguished from other transmission target uplink signals) by conducting at least one of the up-sampling operation, the multiplexing operation, the image elimination operation and the down-sampling operation for the first transmission target uplink signal and the second transmission target uplink signal.

The sixth signal processing unit 1260 may receive the third transmission target uplink signal input from the third signal processing unit 1230 and receive the fourth transmission target uplink signal input from the fourth signal processing unit 1240. The sixth signal processing unit 1260 may generate a transmission target uplink signal (in FIG. 12, referred to as a 'sixth transmission target uplink signal' to be distinguished from other transmission target uplink signals) by conducting at least one of the up-sampling operation, the multiplexing operation, the image elimination operation and the down-sampling operation for the third transmission target uplink signal and the fourth transmission target uplink signal.

The seventh signal processing unit 1270 may receive the fifth transmission target uplink signal input from the fifth signal processing unit 1250 and receive the sixth transmission target uplink signal input from the sixth signal processing unit 1260. The seventh signal processing unit 1270 may generate a transmission target uplink signal (in FIG. 12, referred to as a 'seventh transmission target uplink signal' to be distinguished from other transmission target uplink signals) by conducting at least one of the up-sampling operation, the multiplexing operation, the image elimination operation and the down-sampling operation for the fifth transmission target uplink signal and the sixth transmission target uplink signal.

The MU 130 may transmit the generated seventh transmission target uplink signal to the BTS 110.

If a large number of uplink signals are input to the signal processing unit 150, the output time of the MUX 530 is excessively shortened, and therefore, an error may occur in the generation of a single uplink signal. In this case, a plurality of signal processing units 510 are formed in each node unit as shown in FIG. 12, thereby solving this problem.

In the above, it has been illustrated that a plurality of signal processing units 510 are formed in the MU 130. However, it will be apparent that a plurality of signal processing units 510 may also be formed in the RU 140-*n* and/or the HUB 150. In FIG. 12, it has been illustrated that seven signal processing units 510 are formed in each node unit, but another number of signal processing units 510 may be formed in each node unit. Therefore, the number of signal processing units 510 formed in each node unit is not limited to the scope of the inventive concept. In FIG. 12, it has been illustrated that two uplink signals are input to each signal processing unit 510. However, different numbers of uplink signals (i.e., m) may be input to the signal processing units 510, so that the input uplink signals are processed as a single transmission target uplink signal.

While the inventive concept has been described with respect to the specific embodiments, it will be apparent to those skilled in the art that various changes and modifications may be made without departing from the spirit and scope of the inventive concept as defined in the following claims.

What is claimed is:

1. A node unit of a distributed antenna system, comprising:
   a signal input/output unit configured to receive m uplink signals from m lower node units and output the m uplink signals, where m is a positive integer greater than 1;
   a multiplexer configured to generate a single uplink signal by selectively outputting any one of the m uplink signals at an interval of a predetermined output time;
   a filter configured to output an image eliminated signal by eliminating an image signal from the single uplink signal; and
   a down-sampler configured to output a transmission target uplink signal by converting a sampling rate of the image eliminated signal to correspond to a sampling rate of any one of the m uplink signals.

2. The node unit of claim 1, wherein each of the m uplink signals is a discrete signal sampled in accordance with a predetermined sampling period, and the output time is set to be equal to or less than a time obtained by dividing the sampling period by the positive integer m.

3. The node unit of claim 1, wherein a sampling rate of the single uplink signal is equal to or greater than a value obtained by multiplying a sampling rate of any one of the m uplink signals by the positive integer m.

4. A remote unit of a distributed antenna system, comprising:
   a converter configured to convert a terminal signal received from a mobile communication terminal into a first uplink signal and output the first uplink signal; and
   a multiplexer configured to generate a single uplink signal by selectively outputting any one of the first uplink signal and a second uplink signal at an interval of a predetermined output time, wherein the second uplink signal is received from a lower node unit;
   a filter configured to output an image eliminated signal by eliminating an image signal from the single uplink signal; and
   a down-sampler configured to output a transmission target uplink signal by converting a sampling rate of the image eliminated signal to correspond to a sampling rate of any one of the first uplink signal and the second uplink signal.

5. The remote unit of claim 4, wherein each of the first uplink signal and the second uplink signal is a discrete signal sampled in accordance with a predetermined sampling period, and the output time is set to be equal to or less than a time obtained by dividing the sampling period by two.

6. The remote unit of claim 4, wherein a sampling rate of the single uplink signal is equal to or greater than a value obtained by multiplying a sampling rate of any one of the first uplink signal and the second uplink signal by two.

7. A node unit of a distributed antenna system, comprising:
- a first signal processing unit configured to receive first uplink signals and generate a first transmission target uplink signal by selectively outputting any one of the first uplink signals at an interval of a predetermined output time;
- a second signal processing unit configured to receive second uplink signals and generate a second transmission target uplink signal by selectively outputting any one of the second uplink signals at the interval of the output time; and
- a third signal processing unit configured to receive the first transmission target uplink signal and the second transmission target uplink signal and generate a third transmission target uplink signal by selectively outputting any one of the first transmission target uplink signal and the second transmission target uplink signal at the interval of the output time, wherein at least one of the first signal processing unit, the second signal processing unit, and the third signal processing unit includes:
- a multiplexer configured to generate a corresponding single uplink signal by selectively outputting any one of corresponding received uplink signals at the interval of the output time;
- a filter configured to output an image eliminated signal by eliminating an image signal from the corresponding single uplink signal; and
- a down-sampler configured to output a corresponding transmission target uplink signal by converting a sampling rate of the image eliminated signal to correspond to a sampling rate of any one of the corresponding received uplink signals.

8. The node unit of claim 7, wherein each of the corresponding received uplink signals is a discrete signal sampled in accordance with a predetermined sampling period, and the output time is set to be equal to or less than a time obtained by dividing the sampling period by the number of the corresponding received uplink signals.

9. The node unit of claim 7, wherein a sampling rate of the corresponding single uplink signal is equal to or greater than a value obtained by multiplying a sampling rate of any one of the corresponding received uplink signals by the number of the corresponding received uplink signals.

10. The node unit of claim 7, wherein at least one of the first signal processing unit, the second signal processing unit, and the third signal processing unit includes:
- an up-sampler configured to generate a plurality of up-sampling signals by up-sampling a corresponding received uplink signals according to a predetermined up-sampling rate; and
- a multiplexer configured to generate a corresponding single uplink signal by selectively outputting any one of the up-sampling signals at the interval of the output time.

11. The node unit of claim 10, wherein the up-sampler generates the up-sampling signal by inserting invalid sample information between valid sample information of the corresponding received uplink signals,
wherein each of the corresponding received uplink signals is a discrete signal sampled in accordance with a predetermined sampling period.

* * * * *